United States Patent
Weber et al.

(10) Patent No.: US 11,509,689 B2
(45) Date of Patent: *Nov. 22, 2022

(54) SYSTEMS AND METHODS FOR INTELLIGENT PHISHING THREAT DETECTION AND PHISHING THREAT REMEDIATION IN A CYBER SECURITY THREAT DETECTION AND MITIGATION PLATFORM

(71) Applicant: Expel, Inc., Herndon, VA (US)

(72) Inventors: Elisabeth Weber, Herndon, VA (US); Peter Silberman, Rockville, MD (US); Shamus Field, Herndon, VA (US)

(73) Assignee: Expel, Inc., Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/696,151

(22) Filed: Mar. 16, 2022

(65) Prior Publication Data

US 2022/0210190 A1 Jun. 30, 2022

Related U.S. Application Data

(63) Continuation of application No. 17/501,708, filed on Oct. 14, 2021, now Pat. No. 11,310,270.

(Continued)

(51) Int. Cl.
*H04L 9/40* (2022.01)
*G06N 20/00* (2019.01)

(52) U.S. Cl.
CPC ......... *H04L 63/1483* (2013.01); *G06N 20/00* (2019.01); *H04L 63/1425* (2013.01); *H04L 63/1433* (2013.01)

(58) Field of Classification Search
CPC . H04L 63/14; H04L 63/1408; H04L 63/1425; H04L 63/1433; H04L 63/1483
See application file for complete search history.

(56) References Cited

U.S. PATENT DOCUMENTS 8,122,508 B2 * 2/2012 Rihn ................... G06F 21/562
  709/224
9,154,514 B1 * 10/2015 Prakash ............... G06Q 10/107
(Continued)

*Primary Examiner* — Khang Do
(74) *Attorney, Agent, or Firm* — Padowithz Alce; Chandler Scheitlin; Alce PLLC

(57) ABSTRACT

A system and method for accelerating a cybersecurity event detection and remediation includes extracting corpora of feature data from a suspicious electronic communication, wherein the corpora of feature data comprise at least one corpus of text data extracted from a body of the suspicious electronic communication; computing at least one text embedding value for the suspicious electronic communication; evaluating the text embedding values of the corpus of text data against an n-dimensional mapping of adverse electronic communication vectors, the n-dimensional mapping comprising a plurality of historical electronic communication vectors derived for a plurality of historical electronic communications; identifying whether the suspicious electronic communication comprises one of an adverse electronic communication based on the evaluation of the text embedding value, and accelerating a cybersecurity event detection by routing data associated with the suspicious electronic communication to one of a plurality of distinct threat mitigation routes.

14 Claims, 5 Drawing Sheets

Related U.S. Application Data

(60) Provisional application No. 63/129,836, filed on Dec. 23, 2020, provisional application No. 63/092,307, filed on Oct. 15, 2020, provisional application No. 63/091,409, filed on Oct. 14, 2020.

(56) References Cited

U.S. PATENT DOCUMENTS

| | | | |
|---|---|---|---|
| 9,723,017 B1* | 8/2017 | Pandey | H04L 67/535 |
| 10,193,923 B2 | 1/2019 | Wright et al. | |
| 10,673,814 B1 | 6/2020 | Huffner et al. | |
| 10,855,722 B1 | 12/2020 | Vadlamani | |
| 10,880,322 B1* | 12/2020 | Jakobsson | H04L 51/08 |
| 11,184,370 B1* | 11/2021 | Shen | H04L 63/1416 |
| 2007/0294763 A1* | 12/2007 | Udezue | G06F 21/55 726/22 |
| 2015/0067833 A1* | 3/2015 | Verma | H04L 63/1483 726/22 |
| 2015/0156210 A1 | 6/2015 | Hunt et al. | |
| 2016/0344770 A1* | 11/2016 | Verma | H04L 51/42 |
| 2017/0230323 A1 | 8/2017 | Jakobsson | |
| 2018/0096384 A1* | 4/2018 | Carlough | G06Q 30/0246 |
| 2018/0375877 A1* | 12/2018 | Jakobsson | G06F 16/955 |
| 2019/0019058 A1 | 1/2019 | Woodbridge et al. | |
| 2019/0215335 A1* | 7/2019 | Benishti | H04L 63/1425 |
| 2019/0236139 A1 | 8/2019 | DeFelice | |
| 2019/0349400 A1* | 11/2019 | Bruss | G06N 5/003 |
| 2020/0021608 A1* | 1/2020 | Terada | G06F 17/18 |
| 2020/0125678 A1* | 4/2020 | Conley | G06F 16/3347 |
| 2020/0137083 A1* | 4/2020 | Chen | G06N 3/08 |
| 2020/0137110 A1 | 4/2020 | Tyler et al. | |
| 2020/0175161 A1* | 6/2020 | Giaconi | G06N 5/003 |
| 2020/0186543 A1* | 6/2020 | AlGarawi | H04L 51/212 |
| 2020/0220892 A1* | 7/2020 | Gibson | G06F 16/9024 |
| 2020/0304540 A1 | 9/2020 | Chang et al. | |
| 2020/0358798 A1 | 11/2020 | Maylor et al. | |
| 2021/0021612 A1* | 1/2021 | Higbee | H04L 63/1491 |
| 2021/0092139 A1* | 3/2021 | Nishikawa | H04L 63/1416 |
| 2021/0037053 A1 | 4/2021 | Noon et al. | |
| 2021/0120013 A1 | 4/2021 | Hines et al. | |
| 2021/0120035 A1 | 4/2021 | Onut et al. | |
| 2021/0136089 A1 | 5/2021 | Costea et al. | |
| 2021/0141897 A1* | 5/2021 | Seifert | G06F 21/56 |
| 2021/0250369 A1 | 8/2021 | Avist et al. | |
| 2021/0281606 A1 | 9/2021 | Singh et al. | |
| 2021/0374677 A1* | 12/2021 | Michels | H04L 51/214 |
| 2021/0392155 A1* | 12/2021 | Waplington | G06F 16/285 |
| 2021/0409445 A1 | 12/2021 | Nambirajan et al. | |

* cited by examiner

200

Collecting Phishing Communication Data S205

Implementing Feature Extraction from Communication Data S210

Extracting Component Features of Communication Data S212

Pre-Processing Corpus of Content Data S214

Word / Sentence Embeddings Generation S220

Computing Similarity Metrics S230

Constructing Phishing Threat Intelligence Data S240

Implementing Investigation Support S250

FIGURE 2

SYSTEMS AND METHODS FOR INTELLIGENT PHISHING THREAT DETECTION AND PHISHING THREAT REMEDIATION IN A CYBER SECURITY THREAT DETECTION AND MITIGATION PLATFORM

CROSS-REFERENCE TO RELATED APPLICATIONS

This application is a continuation of U.S. patent application Ser. No. 17/501,708, filed on 14 Oct. 2021, which claims the benefit of U.S. Provisional Application No. 63/091,409, filed 14 Oct. 2020, U.S. Provisional Application No. 63/092,307, filed 15 Oct. 2020, and U.S. Provisional Application No. 63/129,836, filed 23 Dec. 2020, which are incorporated herein in their entireties by this reference.

TECHNICAL FIELD

This invention relates generally to the cybersecurity field, and more specifically to a new and useful cyber threat detection and mitigation system and methods in the cybersecurity field.

BACKGROUND

Modern computing and organizational security have been evolving to include a variety of security operation services that can often shift a responsibility for monitoring and detecting threats in computing and organizational resources of an organizational entity to professionally managed security service providers outside of the organizational entity. As many of these organizational entities continue to migrate their computing resources and computing requirements to cloud-based services, the security threats posed by malicious actors appear to grow at an incalculable rate because cloud-based services may be accessed through any suitable Internet or web-based medium or device throughout the world.

Thus, security operation services may be tasked with mirroring the growth of these security threats and correspondingly, scaling their security services to adequately protect the computing and other digital assets of a subscribing organizational entity. However, because the volume of security threats may be great, it may present one or more technical challenges in scaling security operations services without resulting in a number of technical inefficiencies that may prevent or slowdown the detection of security threats and efficiently responding to detected security threats.

Thus, there is a need in the cybersecurity field to create improved systems and methods for intelligently scaling threat and/or adverse behavior detection capabilities of a security operations service while improving its technical capabilities to efficiently respond to an increasingly large volume of security threats to computing and organizational computing assets.

The embodiments of the present application described herein provide technical solutions that address, at least the need described above.

SUMMARY OF THE INVENTION(S)

In one embodiment, a method for accelerating a cybersecurity event detection and remediation includes extracting one or more corpora of feature data from a suspicious electronic communication sourced from a subscriber, wherein the one or more corpora of feature data comprise at least one corpus of text data extracted from a body of the suspicious electronic communication; computing, by a text embedding model, at least one text embedding value for the suspicious electronic communication based on the corpus of text data; evaluating the one or more text embedding values of the corpus of text data against an n-dimensional mapping of a plurality of historical electronic communication vectors of the subscriber, the n-dimensional mapping comprising a plurality of distinct electronic communication vectors derived for the plurality of historical electronic communications of the subscriber, wherein each of the plurality of distinct communications relates to an electronic communication that was deemed suspicious; identifying whether the suspicious electronic communication comprises one of an adverse electronic communication and a non-adverse electronic communication based on the evaluation of the one or more text embedding values of the corpus of text data against the n-dimensional mapping of adverse electronic communication vectors, wherein if the suspicious electronic communication comprises the adverse electronic communication, accelerating a cybersecurity event detection by routing data associated with the adverse electronic communication to one of a plurality of distinct cybersecurity threat mitigation routes.

In one embodiment, evaluating the text embedding value of the corpus of text data against the n-dimensional mapping of adverse electronic communication vectors includes: identifying a subset of the plurality of historical electronic communication vectors of the plurality of historical electronic communications within a predetermined vector distance radius of the text embedding value of the corpus of text data; and calculating a vector distance between the text embedding value and each distinct vector within the subset of the plurality of historical electronic communication vectors.

In one embodiment, identifying whether the suspicious electronic communication comprises one of the adverse electronic communication and the non-adverse electronic communication includes: identifying one or more historical electronic communication vectors having a calculated cosine distance that is less than or equal to a distance threshold, wherein the distance threshold comprises a maximum cosine distance value for indicating a relatedness between at least two distinct electronic communication vectors; and returning, via a cybersecurity interface, a distinct and historical electronic communication for each of the one or more historical electronic communication vectors.

In one embodiment, at the cybersecurity interface: evaluating the suspicious communication against the distinct and historical electronic communication for each of the one or more historical electronic communication vectors and validating the suspicious communication as the adverse electronic communication based on the evaluation via the cybersecurity interface.

In one embodiment, evaluating the text embedding value of the corpus of text data against the n-dimensional mapping of adverse electronic communication vectors includes: defining a plurality of distinct pairwise between the text embedding value of the corpus of text data and each of the plurality of historical electronic communication vectors of the n-dimensional mapping; and calculating a cosine distance for each of the plurality of distinct pairwise.

In one embodiment, identifying whether the suspicious electronic communication comprises one of the adverse electronic communication and the non-adverse electronic communication includes: identifying one or more historical electronic communication vectors of the plurality of historical electronic communication vectors having a calculated cosine distance from the text embedding value that is less than or equal to a distance threshold, wherein the distance threshold comprises a maximum cosine distance value for indicating a relatedness between at least two distinct electronic communication vectors; and returning, via a cybersecurity interface, a distinct and historical electronic communication for each of the one or more distinct electronic communication vectors.

In one embodiment, the computing, by the text embedding model, the at least one text embedding value for the suspicious electronic communication based on the corpus of text data includes: computing a distinct text embedding value for each of a plurality of distinct sentences of the corpus of text data extracted from the body of the suspicious electronic communication.

In one embodiment, evaluating the text embedding value of the corpus of text data against the n-dimensional mapping of adverse electronic communication vectors includes: calculating an average text embedding value for the corpus of text data based on the distinct text embedding value of each of the plurality of distinct sentences of the corpus of text data extracted from the body of the suspicious electronic communication; defining a plurality of distinct pairwise between the average text embedding value of the corpus of text data and each of the plurality of historical electronic communication vectors of the n-dimensional mapping; calculating a cosine distance for each of the plurality of distinct pairwise; and identifying one or more historical electronic communication vectors of the plurality of historical electronic communication vectors having a calculated cosine distance from the average text embedding value that is less than or equal to a distance threshold, wherein the distance threshold comprises a maximum cosine distance value for indicating a relatedness between at least two distinct electronic communication vectors.

In one embodiment, the method further includes computing, by a phishing machine learning model, a cybersecurity threat inference comprising a phishing threat score based on an input of feature vectors derived from the one or more corpora of feature data from the suspicious electronic communication, wherein the phishing threat score indicates a likelihood that a target electronic communication comprises an adverse electronic communication or a malicious electronic communication.

In one embodiment, an algorithmic structure of the phishing machine learning model comprises a plurality of distinct learnable parameters for computing the cybersecurity threat inference that map at least to feature vectors computed for each of (1) a text body of the suspicious electronic communication and a (2) domain of a sender of the suspicious electronic communication.

In one embodiment, the routing data associated with the suspicious electronic communication to one of the plurality of distinct cybersecurity threat mitigation routes is based on the evaluation of the one or more text embedding values of the corpus of text data of the suspicious electronic communication against the n-dimensional mapping of the plurality of historical electronic communication vectors of the subscriber.

In one embodiment, the routing data associated with the adverse electronic communication to one of the plurality of distinct cybersecurity threat mitigation routes is based on the phishing threat score, wherein each of a plurality of distinct score ranges of a potential phishing threat score is associated with each of the plurality of distinct cybersecurity threat mitigation routes, the routing includes: evaluating the phishing threat score against the plurality of distinct score ranges of the potential phishing threat score; and selecting a distinct cybersecurity threat mitigation route based on the phishing threat score having a score value that is within a distinct score range of the distinct cybersecurity threat mitigation route of the plurality of distinct cybersecurity threat mitigation routes.

In one embodiment, the accelerating the cybersecurity event detection includes automatically bypassing one or more predetermined cybersecurity threat investigation steps for resolving cybersecurity threats involving one or more suspicious electronic communications.

In one embodiment, the evaluating the one or more text embedding values of the corpus of text data against the n-dimensional mapping of adverse electronic communication vectors includes: performing a similarity search of the n-dimensional mapping of adverse electronic communication vectors using the text embedding value of the corpus of text data; and returning, via a cybersecurity interface, one or more historical adverse electronic communications based on the similarity search.

In one embodiment, the evaluating the one or more text embedding values of the corpus of text data against the n-dimensional mapping of adverse electronic communication vectors includes: identifying a cognate set of historical adverse electronic communications based on computing similarity metric values using the text embedding value of the corpus of text data and a plurality of adverse electronic communication vectors; and returning, via a cybersecurity interface, the cognate set of historical adverse electronic communications.

In one embodiment, a system for accelerating a cybersecurity event detection and remediation includes a feature extractor implemented by one or more computers that extracts one or more corpora of feature data from a suspicious electronic communication, wherein the one or more corpora of feature data comprise at least one corpus of text data extracted from a body of the suspicious electronic communication; a text embedding system that computes, using a text embedding model, at least one text embedding value for the suspicious electronic communication based on the corpus of text data; a cybersecurity event identification system implementing by one or more computers that: evaluates the one or more text embedding values of the corpus of text data against an n-dimensional mapping of adverse electronic communication vectors, the n-dimensional mapping comprising a plurality of historical electronic communication vectors derived for a plurality of historical electronic communications, wherein each of the plurality of historical communications relates to a malicious electronic communication with an unlawful intent; identifies whether the suspicious electronic communication comprises one of an adverse electronic communication and a non-adverse electronic communication based on the evaluation of the one or more text embedding values of the corpus of text data against the n-dimensional mapping of adverse electronic communication vectors, wherein if the suspicious electronic communication comprises the adverse electronic communication, accelerating a cybersecurity event detection by routing data associated with the adverse electronic communication to one of a plurality of distinct cybersecurity threat mitigation routes.

In one embodiment, the identifying whether the suspicious electronic communication comprises one of the adverse electronic communication and the non-adverse electronic communication includes: identifying one or more historical electronic communication vectors having a calculated cosine distance that is less than or equal to a phishing distance threshold, wherein the phishing distance threshold comprises a maximum cosine distance value for indicating a relatedness between at least two distinct electronic communication vectors; and returning, via a cybersecurity interface, a distinct and historical electronic phishing communication for each of the one or more historical electronic communication vectors.

In one embodiment, the method includes identifying an electronic sender's address based on the one or more corpora of feature data from the suspicious electronic communication, wherein the electronic sender's address identifies a communication address of a sender of the suspicious electronic communication; evaluating the electronic sender's address against historical sender data associated with the plurality of historical electronic communications; bypassing one or more predetermined cybersecurity threat investigation steps for resolving cybersecurity threats involving one or more suspicious electronic communications based on the evaluation of the electronic sender's address; and wherein routing data associated with the suspicious electronic communication to one of the plurality of distinct cybersecurity threat mitigation routes is based on the evaluation of the electronic sender's address.

In one embodiment, the method includes identifying a corpus of historical submissions of suspicious electronic communications of the subscriber submitting the suspicious electronic communication; evaluating the corpus of historical submissions of suspicious electronic communications; computing an acceleration or deceleration of priority for the suspicious electronic communication based on the evaluation of the corpus of historical submissions of suspicious electronic communications; and prioritizing the suspicious electronic communication within a queue of pending suspicious electronic communications based on the computation of the acceleration or deceleration priority.

In one embodiment, the computing, by the text embedding model, the at least one text embedding value for the suspicious electronic communication based on the corpus of text data includes: computing a distinct text embedding value for each of a plurality of distinct sentences of the corpus of text data extracted from the body of the suspicious electronic communication; the evaluating the text embedding value of the corpus of text data against the n-dimensional mapping of adverse electronic communication vectors includes: calculating an average text embedding value for the corpus of text data based on the distinct text embedding value of each of the plurality of distinct sentences of the corpus of text data extracted from the body of the suspicious electronic communication; defining a plurality of distinct pairwise between the average text embedding value of the corpus of text data and each of the plurality of historical electronic communication vectors of the n-dimensional mapping; calculating a cosine distance for each of the plurality of distinct pairwise; and identifying one or more historical electronic communication vectors of the plurality of historical electronic communication vectors having a calculated cosine distance from the average text embedding value that is less than or equal to a phishing distance threshold, wherein the phishing distance threshold comprises a maximum cosine distance value for indicating a relatedness between at least two distinct electronic communication vectors.

In one embodiment, the system includes a machine learning system that: computes, using a phishing machine learning model, a cybersecurity threat inference comprising a phishing threat score based on an input of feature vectors derived from the one or more corpora of feature data from the suspicious electronic communication, wherein the phishing threat score indicates a likelihood that a target electronic communication comprises an adverse electronic communication or a malicious electronic communication.

In one embodiment, the routing data associated with the suspicious electronic communication to one of the plurality of distinct cybersecurity threat mitigation routes is based on the phishing threat score, wherein each of a plurality of distinct score ranges of a potential phishing threat score is associated with each of the plurality of distinct cybersecurity threat mitigation routes, the routing includes: evaluating the phishing threat score against the plurality of distinct score ranges of the potential phishing threat score; and selecting a distinct cybersecurity threat mitigation route based on the phishing threat score having a score value that is within a distinct score range of the distinct cybersecurity threat mitigation route of the plurality of distinct cybersecurity threat mitigation routes.

BRIEF DESCRIPTION OF THE FIGURES

FIG. 2 illustrates an example method 200 in accordance with one or more embodiments of the present application;

DESCRIPTION OF THE PREFERRED EMBODIMENTS

The following description of the preferred embodiments of the inventions are not intended to limit the inventions to these preferred embodiments, but rather to enable any person skilled in the art to make and use this inventions.

1. System for Remote Cyber Security Operations & Automated Investigations

Figure 1:
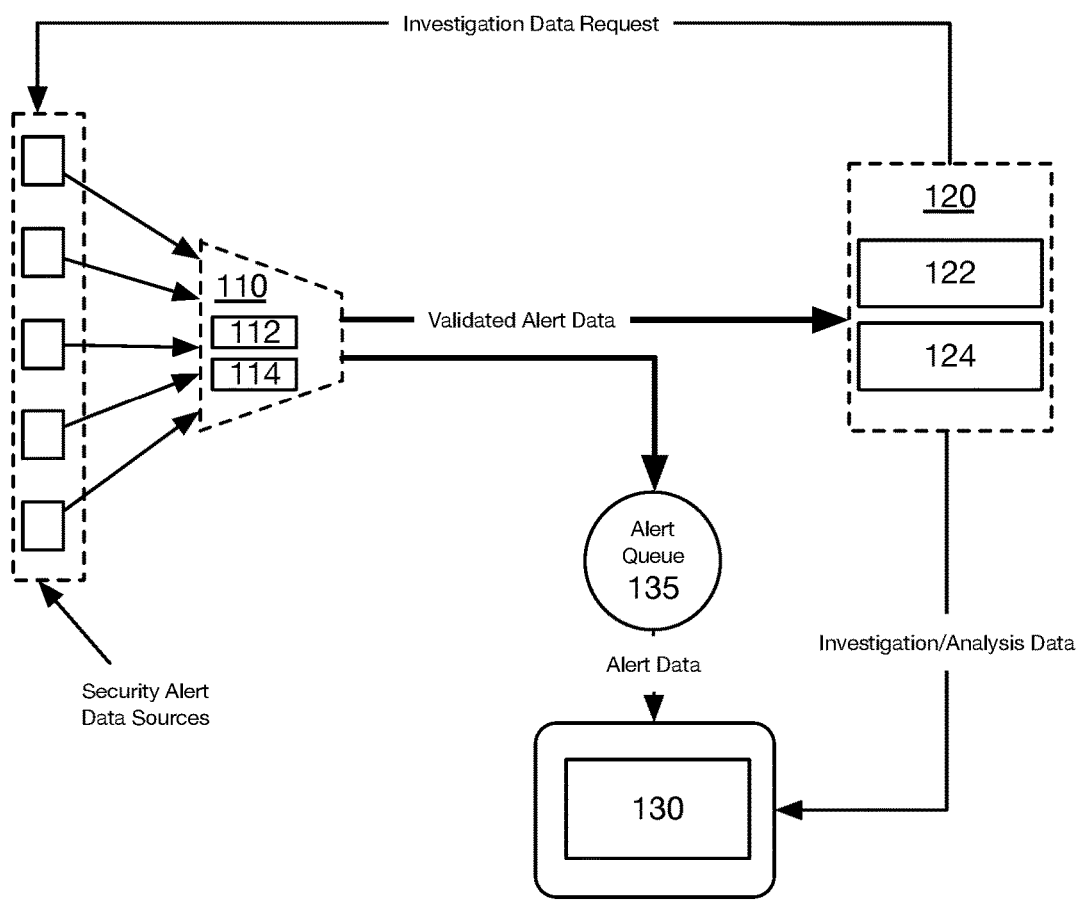
FIG. 1 illustrates a schematic representation of a system 100 in accordance with one or more embodiments of the present application.

As shown in FIG. 1, a system 100 for implementing remote cybersecurity operations includes a security alert engine 110, an automated security investigations engine 120, and a security threat mitigation user interface 130. The system 100 may sometimes be referred to herein as a cybersecurity threat detection and threat mitigation system 100, as described in U.S. patent application Ser. No. 17/488, 800, filed on 29 Sep. 2021, which is incorporated herein in its entirety by this reference.

The system 100 may function to enable real-time cybersecurity threat detection, agile, and intelligent threat response for mitigating detected security threats, as described in U.S. Provisional Application No. 63/091,409, which is incorporated herein in its entirety by this reference.

1.1 Security Alert Engine [Josie]

The security alert aggregation and identification module 110, sometimes referred to herein as the "security alert engine 110" may be in operable communication with a plurality of distinct sources of cyber security alert data. In one or more embodiments, the module no may be implemented by an alert application programming interface (API) that may be programmatically integrated with one or more APIs of the plurality of distinct sources of cyber security alert data and/or native APIs of a subscriber to a security service implementing the system 100.

In one or more embodiments, the security alert engine 110 may include a security threat detection logic module 112 that may function to assess inbound security alert data using predetermined security detection logic that may validate or substantiate a subset of the inbound alerts as security threats requiring an escalation and/or a threat mitigation response by the system 100.

Additionally, or alternatively, the security alert engine 100 may function as a normalization layer for inbound security alerts from the plurality of distinct source of security alert data by normalizing all alerts into a predetermined alert format.

1.1.1 Security Alert Machine Learning Classifier

Optionally, or additionally, the security alert engine 110 may include a security alert machine learning system 114 that may function to classify inbound security alerts as validated or not validated security alerts, as described in more detail herein.

The security alert machine learning system 114 may implement a single machine learning algorithm or an ensemble of machine learning algorithms. Additionally, the security alert machine learning system 114 may be implemented by the one or more computing servers, computer processors, and the like of the artificial intelligence virtual assistance platform no.

The machine learning models and/or the ensemble of machine learning models of the security alert machine learning system 114 may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C 4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be used in implementing the security alert machine learning system 114 and/or other components of the system 100.

1.2 Automated Investigations Engine [Ruxie]

The automated security investigations engine 120, which may be sometimes referred to herein as the "investigations engine 120", preferably functions to automatically perform investigative tasks for addressing and/or resolving a security alert or security event. In one or more embodiments, the investigations engine 120 may function to automatically resolve a security alert based on results of the investigative tasks.

In one or more embodiments, the investigations engine 120 may include an automated investigation workflows module 122 comprising a plurality of distinct automated investigation workflows that may be specifically configured for handling distinct security alert types or distinct security events. Each of the automated investigation workflows preferably includes a sequence of distinct investigative and/or security data production tasks that may support decisioning on or a disposal of a validated security alert. In one or more embodiments, the investigations engine 120 may function to select or activate a given automated investigation workflow from among the plurality of distinct automated investigation workflows based on an input of one or more of validated security alert data and a security alert classification label. That is, in such embodiments, one or more of the plurality of automated investigation workflows may be mapped to at least one of a plurality of distinct validated security alerts or events, such that a detection of the validated security alert or event automatically causes an execution of a mapped or associated automated investigation workflow.

Additionally, or alternatively, the investigations engine 120 may include an investigations instructions repository 124 that includes a plurality of distinct investigation instructions/scripts or investigation rules that inform or define specific investigation actions and security data production actions for resolving and/or addressing a given validated security alert. In one or more embodiments, the investigations instructions repository 124 may be dynamically updated to include additional or to remove one or more of the plurality of distinct investigation instructions/scripts or investigation rules.

1.3. Security Mitigation User Interface [Workbench]

The security mitigation user interface 130 may function to enable an analyst or an administrator to perform, in a parallel manner, monitoring, investigations, and reporting of security event incidents, and/or resolutions to subscribers to the system 100 and/or service implementing the system 100. In some embodiments, an operation of the security user interface 130 may be transparently accessible to subscribers, such that one or more actions in monitoring, investigation, and reporting security threats or security incidents may be surfaced in real-time to a user interface accessible, via the Internet or the like to a subscribing entity.

Accordingly, in or more embodiments, an administrator implementing the security mitigation user interface 130 may function to make requests for investigation data, make requests for automated investigations to the automated investigations engine 120, obtain security incident status data, observe or update configuration data for automated investigations, generate investigation reports, and/or interface with any component of the system 100 as well as interface with one or more systems of a subscriber.

Additionally, or alternatively, in one or more embodiments, the security mitigation user interface 130 may include and/or may be in digital communication with a security alert queue 135 that stores and prioritizes validated security alerts.

1.4 Phishing Engine::Phishing Detection+Phishing Threat Remediation Subsystem [Phishing Workflow]

In one or more embodiments, the system 100 includes a phishing engine or subsystem 300 for detecting malicious communications and producing intelligence for rapidly remediating cybersecurity threats resulting from detected malicious communication threats.

Figure 3:
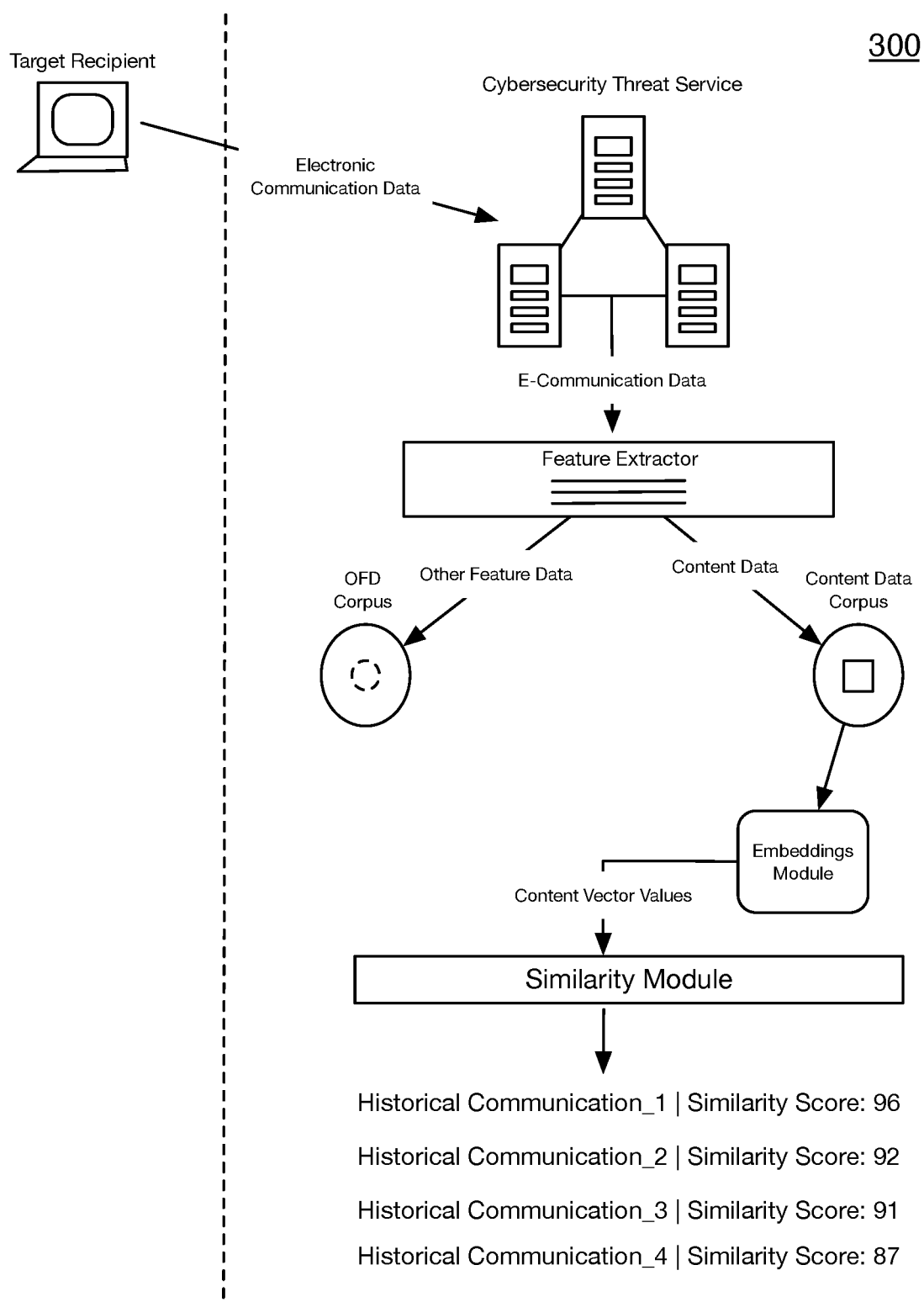
FIG. 3 illustrates an example subsystem 300 of system 100 that includes a schematic representation of a phishing engine in accordance with one or more embodiments of the present application.

In a preferred embodiment, the subsystem 300 includes a feature extractor, an embedding modules, and a similarity modules, as shown by way of example in FIG. 3. In this preferred embodiment, the feature extractor may function to receive, as input, electronic communication data and extract content data (e.g., an email body or the like) from the electronic communication data. In some embodiments, the feature extractor additionally or alternatively includes a pre-processing module or unit that functions to pre-processing the content data in preparation for an embedding service or the like.

In one or more embodiments, the embeddings module may function to compute or generate word and/or sentence embeddings (i.e., semantic vector values) based on the content data extracted from the electronic communication data. In such embodiments, the embeddings module may be implemented with an external embeddings (e.g., Bert-as-a-service or the like) that communicates with the embeddings modules to generate word and/or sentence embeddings.

In one or more embodiments, the similarity module may function to compute similarity metric values based on an evaluation of the embedding values of the content data. In some embodiments, the similarity module may include and/or have access to a database storing one or more corpora of historical electronic communication data (e.g., historical malicious communications, non-malicious communications (e.g., marketing emails, etc.), and/or the like).

2. Method for Automated Phishing Detection|Phishing Threat Intelligence Generation|Cybersecurity Investigation Support As shown in FIG. 2, a method 200 for automated phishing detection and phishing threat mitigation includes receiving one or more electronic communications data S205, feature data extraction and preprocessing S210, generate word embeddings and/or sentence embeddings for communication corpus S220, compute similarity score for target email S230, and [return email with highest score] identify whether remediate cybersecurity threat S240. The method 200 may additionally include computing a machine learning-based phishing threat score S235.

Figure 4:
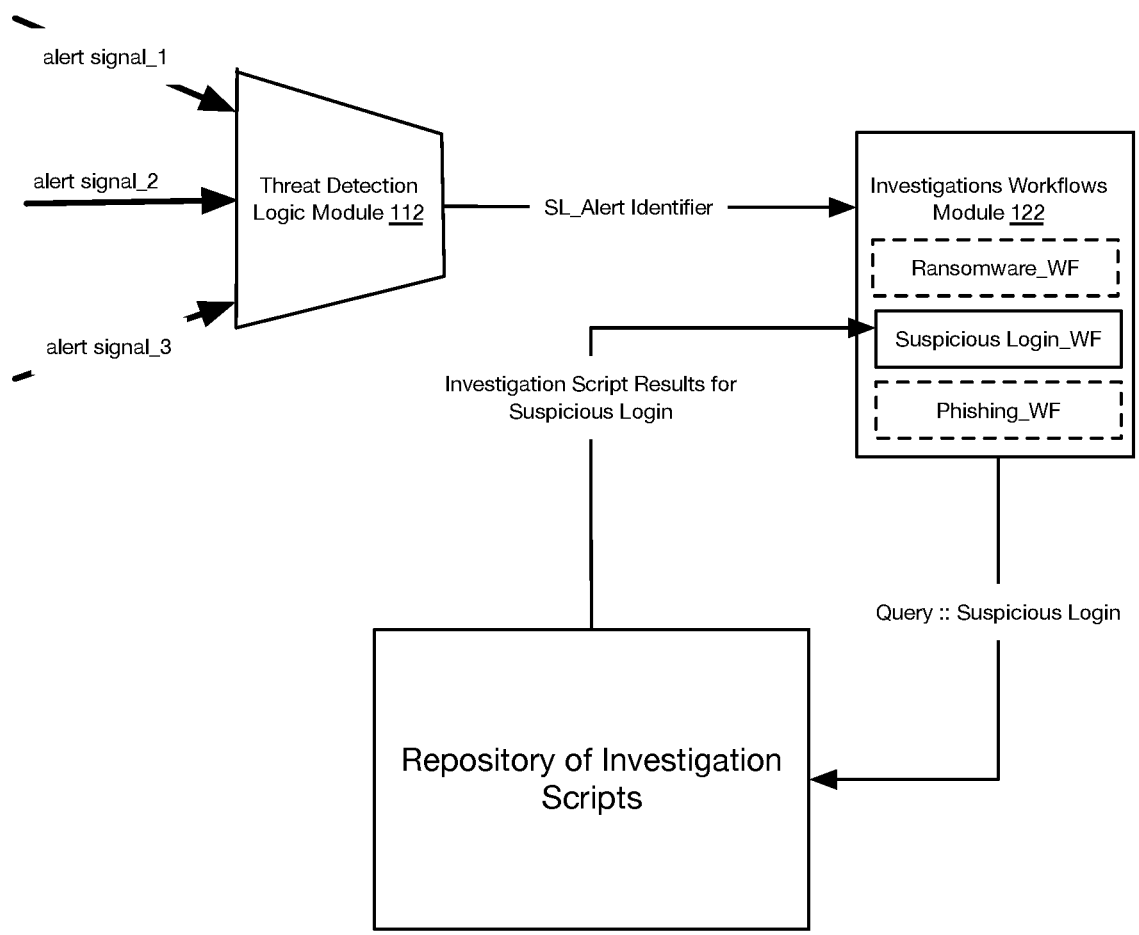
FIG. 4 illustrates a schematic representation of a first implementation of one or more sub-components of the system 100 in accordance with one or more embodiments of the present application.
Figure 5:
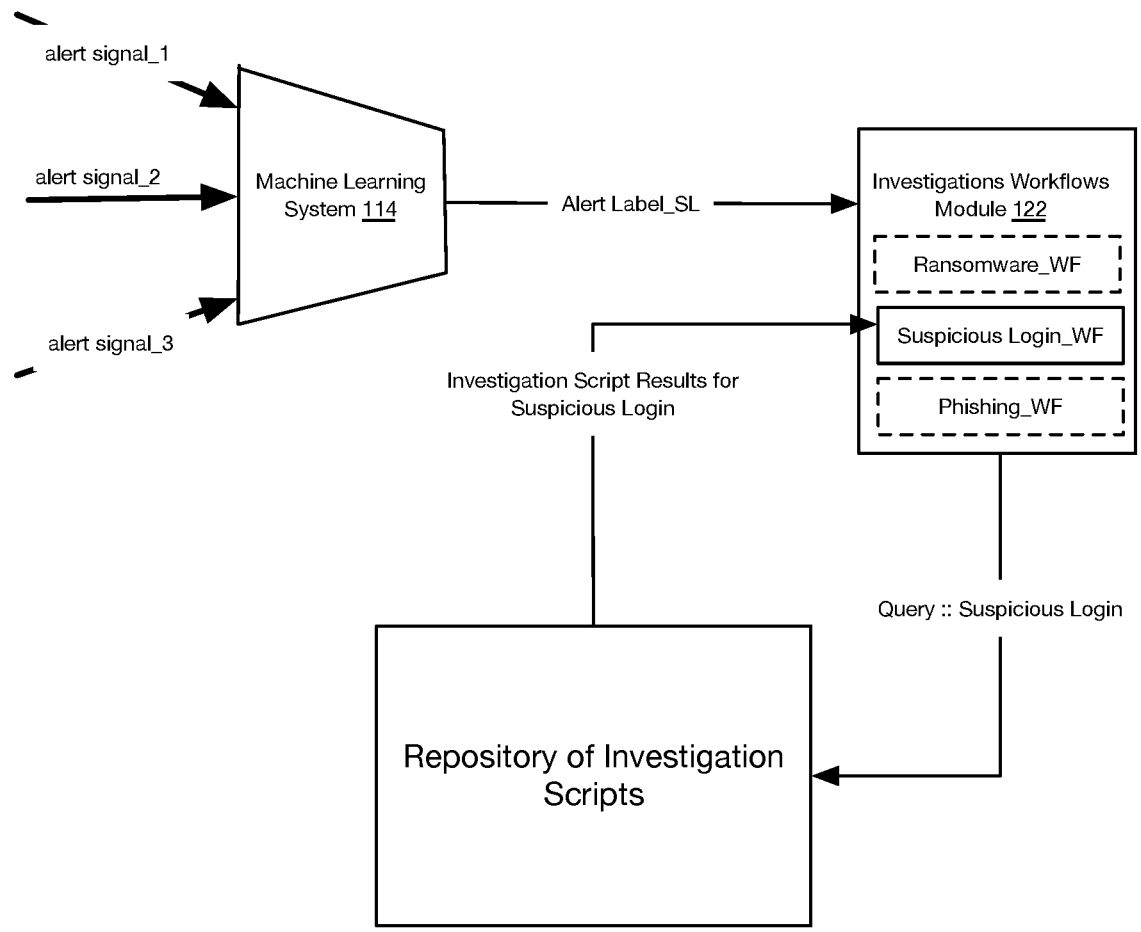
FIG. 5 illustrates a schematic representation of a second implementation of one or more sub-components of the system 100 in accordance with one or more embodiments of the present application.

The method 200 preferably includes one or more techniques for identifying fraudulent communications and/or messages and generating intelligent insights based on the discovered fraudulent digital communications that enhances an expedited triage or remediation of an identified cybersecurity threat. In one or more embodiments, the method 200 may be triggered and/or automatically initialized based on alert signals triggering an automated phishing workflow (e.g., Phishing_WF), as illustrated by example in FIGS. 4 and 5.

2.05 Phishing Data Collection

S205, which includes receiving and/or collecting phishing communication data, may function to receive one or more electronic communications. The one or more electronic communications (e.g., phishing communications, scam communications, marketing communications, etc.) may include and/or relate to a communication generated with malicious and/or fraudulent intent for purposes of committing one or more fraudulent acts or otherwise, performing one or more malicious attacks based on information obtained from and/or actions performed by the recipient of the electronic communication. The one or more electronic communications may be communicated through any suitable digital medium including, but not limited to, email, chat messaging, SMS, software applications (e.g., Slack, Teams, etc.), social networking messages, video messaging, and/or the like.

In one or more embodiments, S205 may function to collect the one or more electronic communications from a target end user and/or a target recipient (or target end user's computing system) of the one or more electronic communications. In one implementation, the target recipient may simply forward a suspected and/or confirmed malicious electronic communication message to a service or system implementing the method 200. In such embodiments, the forwarding may be made to a designated electronic address for collecting electronic communication messages that may be malicious.

In another implementation, S205 may function to collect or receive the one or more electronic communications based on a selection of an electronic reporting feature or link. In this implementation, a target recipient of the one or more electronic communications may function to select a phishing reporting feature within an electronic communication interface (e.g., email inbox or the like) that may automatically route a subject (suspected or confirmed malicious) electronic communication message to a system, repository, and/or service.

In one embodiment, if a target recipient opens a potential malicious electronic communication, a phishing reporting link or electronically displayed featured may be made available and selected for reporting/forwarding the potentially malicious electronic communication to a threat detection and remediation service implementing the method 200. Additionally, or alternatively, a phishing reporting link may be selected for reporting a potential malicious communication in an unopened state. That is, even if the potential malicious communication has not been opened and/or the contents of the communication read by the target recipient, the target recipient may select the potentially malicious communication and further select the phishing reporting email, which together would function to transmit or forward the potentially malicious communication data for evaluation and/or threat detection/remediation.

In yet a further implementation, S205 may function to collect or receive electronic communication data that is suspected as being malicious or fraudulent via a suspected threat reporting application programming interface (API). In one or more embodiments, the threat reporting API may enable an integration with third-party service providers and/or subscribers to a threat service/platform implementing the system 100 and/or method 200. In use, any party, including but not limited to subscribers and third-party vendors, the threat reporting API integration may directly report a suspected malicious electronic communication or any other electronic communication data that may be useful for identifying threats and/or suspicious behaviors.

Additionally, or alternatively, the electronic communication reporting data may include an indication of whether the target recipient succumbed to or was tricked by the content of the electronic communication. In one or more embodiments, in which the target recipient succumbed to an attack of a malicious communication, the electronic communication reporting data may further include details of the exposure including, but not limited to, details relating to login credentials provided, data files or packets that may have been downloaded, and/or any suitable protected or confidential information that may have been shared as a response to interfacing with the electronic communication.

2.10 Feature Extraction+Preprocessing

S210, which includes implementing a multi-segment extraction of a subject electronic communication, may function to extract features from and process a received electronic communication. In one or more embodiments, S210 may function to implement a feature extractor that may function to extract one or more predetermined features from the electronic communication data.

2.12 Electronic Communication Component Extraction

In one or more embodiments, the electronic communication may include an Internet-based communication, such as an email. In such embodiments, a potentially malicious email may include multiple distinct segments or distinct components including, but not limited to, a content body, one or more domains or sender electronic address, one or more attachments, one or more hyperlinks (e.g., unsubscribe link), one or more images or media, color variation, and/or the like. Additionally, or alternatively, a target electronic communication may include and/or be appended with submitter information or data that identifies a subscriber or the like to a cybersecurity service implementing the system 100 and/or the method 220. In such embodiments, S210 includes S212, may function to extract each distinct feature and/or email component from the email communication including at least an email body (e.g., email content), the domain of the sender of the email, and attachment types included with the email.

Additionally, or alternatively, S210 may function to extract each distinct component of a subject electronic communication into distinct corpora or groups. In this way, each distinct component may be additionally processed along a distinct track. Accordingly, in one or more embodiments, S210 may function to enumerate at least two distinct corpora or groups of communication components that includes a first corpus of content data that may be made available to an automated workflow for identifying malicious or non-malicious content and a second corpus of assorted communication data that may be made available for evaluation in investigation support for an analyst or the like. The corpus of assorted electronic communication data preferably includes all other extractable features or components of a subject electronic communication that may provide positive or negative signals except the content data of the content of the subject communication. For example, if the electronic communication comprises an email communication, S210 may function to extract content features (i.e., the written message and/or media within a body of the email) into a first corpus of content data and extract sender email domain, attachments, hyperlinks, and/or the like into a second corpus of assorted email components.

Additionally, or alternatively, S210 may function to extract submitter (identification) data associated with a target electronic communication. In such embodiments, S210 may function to use submitter identification data or the like to identification and retrieve previous or historical submissions of suspicious electronic communications and the like. Accordingly, S210 may function to create a corpus of submitter data and/or augment the corpus of assorted electronic communication data with data relating to the submitter of the target electronic communication and/or that includes data relating to the historical submissions by the submitter.

2.14 Content Processing

Additionally, or alternatively, S210 includes S214, which includes pre-processing the corpus of content data, may function to, in advance of a computation or extraction of word and/or sentence embeddings from the corpus of content data, filter or clean from the corpus extraneous features. In this way, a word and/or sentence embedding service or component may function to convert the corpus of content data into vector values without difficulty and with improved accuracy. For example, S210 may function to remove or process out of any written content within a subject corpus of content data one or more of punctuation and extraneous characters (e.g., brackets, apostrophes, computation signs, non-alphanumeric characters, and/or the like).

In one variant implementation, S210 may function to initially identify homoglyphic text elements or homoglyphic words within the corpus of content data. For each identified homoglyphic element identified, S210 may function to identify a potential intended and/or real term and compute a word embeddings value or sentence embeddings value of a given word or text string in which the intended or the real term may be used as a substitute for the homoglyphic element. That is, in some embodiments, because a homoglyphic element may be misspelled or otherwise includes a like or similar character to a real or intended term, an embeddings value may be computed that is not entirely accurate or that fails to capture the intended meaning of a target homoglyphic term or element.

Similarly, to further improve embeddings values for a given corpus of content data, in one or more embodiments, S210 may additionally function to correct intentionally misspelled terms within the corpus of content data. For instance, in one or more embodiments, S210 may function to scan the corpus of content data for misspelled terms and automatically generate a correct spelling for each misspelled term. S220 may function to substitute the misspelled term with the correctly spelled term prior to generating the embeddings values for a subject corpus of content data.

2.20 Embeddings Generation

S220, which includes obtaining embeddings values based on content data, may function to convert the corpus of content data obtained from an electronic communication to or generate vector representations or text representations for at least a text component of the corpus of content data. In a preferred embodiment, S220 may function to implement or access a word, sentence or text embeddings service (e.g., Bert-as-a-service) or an embeddings module (e.g., a component of subsystem 300) that may define part of a threat detection and remediation service or system implementing the systems (e.g., system 100) and/or methods (e.g., method 200) described herein. S220, using a word and/or sentence embeddings generator, may function to generate one or more text representations based on an input of the corpus of content data. That is, S220 may function to generate a plurality of distinct text representations in which words or a string of text (e.g., a sentence or the like) having a similar meaning may have a similar representation.

Accordingly, S220 may function to collect the corpus of content data, extract a plurality of distinct strings of text from the corpus of content data, and compute text representations based on the strings of text. Preferably, each distinct string of text (e.g., each distinct sentence or the like) extracted from the content data may be fed as input into a sentence embeddings model that may function to map each distinct string of text to vectors of real numbers or the like in n-dimensional space.

In a first, preferred implementation, S220 may function to implement or use a bidirectional encoder representation form transformers (BERT) model as a target word and/or sentence embeddings service or model for generating word/ sentence embeddings for each of the plurality of distinct pieces of content of the corpus of content data. It shall be recognized that BERT may comprise a transformer-based machine learning technique for natural language processing. In this first implementation, S220 may function to generate word and/or sentence embeddings based on using BERT-as-a-service. For example, a word and/or sentence embeddings or language machine learning model, may function to receive an input of one or more strings of texts or one or more distinct sentences or words and generate or output one or more vector representations of the texts or sentences.

In a second implementation, S220 may function to implement a word and/or a sentence embedding technique including a universal sentence encoder (USE), such as a Deep Averaging Network method, which functions to average sentence embeddings of a target input of textual data and passes the resultant averages through a feedforward network or the like to generate a vector representation for each target segment of text data. Preferably, the USE may be trained using a range of supervised and unsupervised tasks.

In a third implementation, S220 may function to implement a word and/or a sentence embedding technique including a smooth inverse frequency (SIF). Using the SIF technique, S220 may function to compute a weighted average of sentence embeddings for each target segment of text data. In this second implementation, the weighted average for each target segment of user input may be determined based on a word frequency.

In a fourth implementation, S220 may function to implement as a word and/or a sentence embedding technique a simple average of sentence embeddings. That is, S220 may function to compute an unweighted average of sentence embeddings that preferably may not allow for preferential weightings based on one or more characteristics of a target segment of text data.

Additionally, or alternatively, S220 may function to select one or more of a plurality of distinct word and/or sentence embeddings techniques based on attributes or characteristics of a given corpus of content data. For instance, S220 may function to select a first embeddings technique of a plurality of distinct embeddings techniques based on an average length of the distinct strings (i.e., average number of tokens in a string) of text within a corpus of content data. Thus, S220 may function to select from one of any available sentence embeddings techniques, such as the sentence embeddings techniques described in the above implementations, based on one or more characteristics of the content data. In some embodiments, S220 may function to select a combination of two or more distinct sentence embeddings techniques for generating sentence embeddings for a target corpus of content data.

It shall be recognized that any suitable or combination of word and/or sentence embeddings techniques and/or services may be implemented in S220 for computing sentence embeddings for a given corpus of content data.

2.30 Similarity Computation|Mapping to Corpus of Historical Embeddings

S230, which includes implementing a similarity computation, may function to compute one or more similarity metric values for a given electronic communication based on embeddings data for the given electronic communication and embeddings data of a corpus of historical electronic communications. In some embodiments, a corpus of historical electronic communication may be sourced on a per subscriber basis. In such embodiments, an evaluation of a target suspicious electronic communication from a given subscriber may be performed against the corpus of historical electronic communications (e.g., electronic communications received by the given subscriber) sourced from the given subscriber. However, it shall be recognized that a global corpus of historical electronic communications may be used that includes a collection of historical electronic communications sourced from multiple subscribers and other sources of sample electronic communications.

In a first implementation, S230 may function to perform a similarity search within embeddings data of a corpus of historical observed communications using embeddings values of a given electronic communication. In one or more embodiments, S230 may function to perform the similarity search to identify historical electronic communications having similar or same embeddings values as the given corpus of content data for the given electronic communication.

In this first implementation, the similarity search within embeddings data of the corpus of historical electronic communications may be performed using an average of the embeddings values of a given corpus of content data. In a variant, S230 may function to perform a plurality of searches within the corpus of historical electronic communications using each distinct word and/or sentence embeddings value within the given corpus of content data.

In one or more embodiments, the similarity search may additionally, or alternatively include an assessment of a subject corpus of content data against the embeddings data of the corpus of historical electronic communications. In a particular embodiment, S230 may function assess the one or more embeddings values of a corpus of content data for a given electronic communication against a plurality of distinct embeddings of the corpus of historical electronic communications.

Additionally, or alternatively, in one embodiment, S230 may function to generate a plurality of distinct pairwise between the embeddings of the subject corpus of content data and the embeddings of each of the plurality of distinct embeddings of the corpus of historical electronic communications. In such embodiment, S230 may function to compute a raw distinct value between the members of each of the plurality of distinct pairwise. In one embodiment, the computation between the members of the pairwise includes computing a sum difference between the embeddings value of the subject corpus of content data and the embeddings value of one of the embeddings of the corpus of historical electronic communications.

In a preferred embodiment, S230 may function to compute a similarity metric value for a given pairwise using cosine distance/similarity. In such preferred embodiment, S230 may function to identify a theta angle between each of the members within a subject pairwise and calculate the cosine of the theta angle. Preferably, the cosine of the theta angle for a given pairwise corresponds to or includes the similarity metric value for and/or assigned to the given pairwise.

In a second implementation, S230 may function to perform a similarity computation based on mapping each word and/or sentence embeddings values of a given corpus of content data for an electronic communication in an n-dimensional space that includes embeddings vector values for each distinct member of a corpus of historical electronic communications. In this second implementation, S230 may function to identify clusters of embeddings of historical electronic communications surrounding one or more embeddings of the given corpus of content data. In a preferred embodiment, either one or more embeddings of the given corpus of content data or an average embeddings value for the given corpus of content data may be set or defined as a centroid for the identified clusters. Accordingly, in such preferred embodiment, S230 may function to set a predetermined radius from the centroid to define a scope and/or size of a relevant cluster for additional assessment and/or evaluation.

Similar to the first implementation, in the second implementation, S230 may function to define pairwise between an embeddings of a given corpus of content data and each of a plurality of distinct embeddings of the corpus of historical electronic communication that may be within an identified cluster. Likewise, a similarity metric value for a given pairwise may be computed based on a raw distance value computation and/or a cosine distance value for the given pairwise, as previously described.

2.4 Surfacing Threat Intelligent for Investigation+Remediation Support

S240, which includes generating phishing threat intelligence data, may function to identify a cognate set of one or more malicious electronic communications based on an evaluation (e.g., S230) each of the computed similarity metric values for a given electronic communication.

In one or more embodiments, S240 may function to identify one or more cognate or similar malicious communications based on identifying the one or more historical electronic communications producing similarity metric values satisfying or exceeding a phishing threat threshold or a similarity threshold. Preferably, the phishing threat threshold or the similarity threshold relates to a minimum similarity metric value or score that may indicate a high or statistically significant degree of similarity between two compared pieces of content or compared embeddings.

Thus, in such embodiments, S240 may function to compute phishing threat intelligence data that includes a cognate set or a plurality of historical electronic communications having a sufficient or high degree of relatedness to a given corpus of content data for an electronic communication.

In one or more embodiments, S240 may additionally or alternatively function to rank each of the plurality of historical electronic communications within a returned set based on an assigned similarity metric value. For instance, S240 may function to rank historical electronic communications in sequential order from first to last based on a highest similarity metric value being the first ranked and the lowest similarity metric value between the last ranked.

Accordingly, for each of the plurality of historical electronic communications provided with the phishing threat intelligence data, S240 may function to automatically access each of an original electronic communication data for each of the plurality of historical electronic communications in a cognate set and augment the original electronic communication data to the phishing threat intelligence data. In one or more embodiments, the original electronic communication data may include one or more the original content of the communication, a sender's communication address and domain, any attachments, any hyperlinks, and/or any suitable attribute of the original communication.

Additionally, or alternatively, S240 may function to automatically augment to or automatically include within the phishing threat intelligence data similar electronic communications data from previously remediated security alerts. In this way, duplicate emails may be avoided or may be known during an evaluation and/or handling of a pending or real-time security alert.

Additionally, or alternatively, S240 may function to generate phishing threat intelligence data that identifies or includes criteria and/or attributes that are drivers or signals that encouraged the one or more similarity metric values. For instance, S240 may function to add criteria such as, but not limited to, domain match, attachment match, timing (of send) requirements, content match, and/or the like.

Additionally, or alternatively, S240 may function to generate a probability of phishing score for a given corpus of content data based on the phishing intelligence data and preferably, generate a proposed remediation action based on the phishing intelligence data and/or the probability of phishing score. In some embodiments, the method 200 includes a spectrum or continuum of phishing criteria and/or phishing thresholds that each correspond to a proposed remediation action. In such embodiments, S240 may function to assess the phishing score for a given corpus of content data to the phishing criteria and output a proposed remediation action that is most recently satisfied by the phishing score.

Machine Learning-Based Phishing Threat Score

Additionally, or alternatively, S240 may function to implement a phishing machine learning model that may function to compute a predictive inference for identifying electronic communications that involve a threat of phishing or scam. In one or more embodiments, the predictive inference comprises a phishing threat score (value) or a suspicious communication threat score that indicates a likelihood or a probability that a target electronic communication may be a malicious communication, a phishing communication, and/or a fraudulent communication created by an online attacker or the like with an intent to misappropriate information via trickery or by defrauding a recipient of the target electronic communication. In such embodiments, the phishing threat score may be a value in any suitable alphanumeric range or gradient-based ranges including, but not limited to, values between 0-100, A-z, and/or the like.

In a preferred embodiment, S240 may function to compute, via the phishing threat score based on an input of feature vectors derived from one or more corpora of feature data extracted from a suspicious electronic communication. In one or more embodiments, an algorithmic structure of the phishing machine learning model may be configured with a plurality of distinct learnable parameters that map to feature vectors computed for distinct attributes of a typical electronic communication including, but not limited to, a text body, domains, attachment types, communication header or subject, and/or the like. Accordingly, S240 may function to implement a specifically configured feature extractor that extracts feature data of a plurality of components of an electronic communication and vectorize each of the plurality of components as inputs to corresponding learnable/learned parameters of the phishing threat model for computing a cybersecurity threat inference and/or phishing threat score.

Additionally, or alternatively, in an evaluation of phishing threat intelligence data, S240 may function to evaluate a computed phishing threat score for a target electronic communication against a plurality of distinct phishing threat score ranges. In one or more embodiments, each of the plurality of distinct phishing threat score ranges may be associated with or mapped to one of a plurality of distinct cybersecurity event disposal or threat mitigation routes. Accordingly, in some embodiments, the method 200 may function to identify a distinct score range of a target phishing threat score and select a cybersecurity event disposal or threat mitigation route based on the phishing threat score having a score value that is within the distinct score range of the cybersecurity route of the plurality of distinct cybersecurity threat mitigation routes.

In some embodiments, the phishing machine learning model comprises an ensemble of distinct (phishing) machine learning models that may operate in combination to compute or produce the predictive inference for determining whether a target communication may be malicious or non-malicious. In such embodiments, each machine learning model may be trained with one or more corpora of labeled training data comprising a plurality of distinct training samples of malicious (adverse) or non-malicious (non-adverse) electronic communications.

2.5 Accelerated Cybersecurity Investigation Support

S250, which includes surfacing the phishing threat intelligence data, may function to automatically return or provide the phishing threat intelligence data as a part of potentially malicious communication or as an augmentation to security alert data. In this way, the phishing threat intelligence data may be used to support or enable an accelerated handling of one or more cybersecurity investigation actions including, but not limited to, escalating (i.e., validating a security alert) or de-escalating a pending cybersecurity investigation or causing an initialization of one or more new cybersecurity investigations for resolving one or more cybersecurity threats that may be imminent and/or that may include potentially compromised computing systems and/or computing resources.

In one or more embodiments, S250 may function to accelerate a cybersecurity event detection and/or investigation of a target electronic communication via automatically bypassing one or more predetermined cybersecurity event investigation steps for handling cybersecurity events involving suspicious electronic communications. That is, in some embodiments, a system or a service implementing the method 200 may implement cybersecurity detection and/or investigation policy having a plurality of distinct (sequence of) steps for successfully handling a cybersecurity event involving a potentially malicious electronic communication. In such embodiments, if the phishing threat intelligence data derived for a target potentially harmful electronic communication includes one or more historical phishing electronic communications returned on the basis of similarity to the target electronic communication, S250 may function to automatically bypass one or more detection and/or investigation steps of the distinct steps for handling the cybersecurity event based on the potential rapid identification of the target electronic communication as being malicious or as being a phishing communication.

In one or more embodiments, the automatic bypass may include generating or proposing one or more cybersecurity threat mitigation routes or disposals based on identifying the historical threat mitigation actions or threat mitigation routes previously executed for the historically similar electronic communications surfaced based on the evaluated of the target suspicious electronic communication. In other words, S250 may function to produce one or more proposed (or recommended) cybersecurity threat handling or cybersecurity threat response actions for the target suspicious electronic communication by borrowing the cybersecurity threat response to the one or more similar historical electronic communications, as described in U.S. Provisional Application No. 63/239,716, which is incorporated herein in its entirety by this reference.

Accordingly, in such embodiments, S250 may function to recycle a previous cybersecurity threat response to one or more of the similar or same historical electronic communications to the target suspicious electronic communication thereby accelerating a cybersecurity detection and mitigation of the target suspicious electronic communication by potentially bypassing one or more automated or semi-automated cybersecurity threat investigation steps and cybersecurity threat response steps.

In one or more embodiments, when the phishing threat intelligence data includes a computed phishing threat score for the target suspicious electronic communication, S250 may function to accelerate a cybersecurity event detection and investigation of a target electronic communication via rapidly identifying a cybersecurity event or threat mitigation route of a plurality of distinct cybersecurity event routes. That is, in such embodiments, S250 may automatically bypass substantially all or potentially all cybersecurity event investigation steps (e.g., investigation data sourcing, aggregation, and investigation data analysis, etc.) based on a machine learning-based phishing threat score for the target electronic communication and automatically decisioning the cybersecurity event disposal or threat mitigation route based solely or mainly on the computed phishing threat score.

In one embodiment, the method includes identifying an electronic sender's address based on the one or more corpora of feature data from the suspicious electronic communication, wherein the electronic sender's address (e.g., sender's email address) identifies a communication address of a sender of the suspicious electronic communication. In such embodiments, the method 200 may function to evaluate the electronic sender's address against historical sender data associated with the plurality of historical electronic communications of one or more subscriber or the like. In some embodiments, S250 may function to create a search query that includes the electronic sender's address and perform a search of a repository having the historical sender data. In some embodiments, the electronic sender's address may be converted to a vector and a search performed of a vectorized database of the historical sender data. Accordingly, S250 may function to bypass one or more predetermined cybersecurity threat investigation steps for resolving cybersecurity threats involving one or more suspicious electronic communications based on the evaluation of the electronic sender's address. Additionally, or alternatively, routing data associated with the suspicious electronic communication to one of the plurality of distinct cybersecurity threat mitigation routes may be based on the evaluation of the electronic sender's address.

Additionally, or alternatively, the method 200 may include identifying a corpus of historical submissions of suspicious electronic communications of the subscriber submitting the suspicious electronic communication. In such embodiments, the method 200 may function to evaluate the corpus of historical submissions of suspicious electronic communications made by the subscriber (e.g., the submitter)

and compute an acceleration or deceleration priority (value or the like) for the suspicious electronic communication based on the evaluation of the corpus of historical submissions of suspicious electronic communications. An acceleration or deceleration priority, as referred to herein, preferably relates to a likelihood or probability that a target suspicious electronic communication includes a degree of cybersecurity threat or risk satisfying or exceeding a threat threshold (e.g., a maximum threat value that if satisfied or exceeded indicates a high probability of loss or risk resulting from the suspicious electronic communication). Accordingly, S250 may function to re-prioritize the suspicious electronic communication within a queue of pending suspicious electronic communications based on the acceleration priority. In this way, pending suspicious electronic communications having a high cybersecurity threat may be handled expeditiously in advance of other pending suspicious electronic communication having a lower cybersecurity threat.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

Although omitted for conciseness, the preferred embodiments may include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed:

1. A method implemented by one or more computers for accelerating a detection of a cybersecurity event and executing a cybersecurity remediation, the method comprising:
    computing, by a text embedding model, an array of embeddings based on content feature data extracted from a target electronic communication;
    identifying an electronic sender's address based on the content feature data from the target electronic communication, wherein the electronic sender's address identifies a communication address of a sender of the target electronic communication;
    performing an embedding search of a corpus of embeddings of a plurality of distinct historical electronic communications based on the array of embeddings of the target electronic communication;
    evaluating the electronic sender's address against historical sender data associated with one or more historical electronic communications;
    identifying at least one distinct historical electronic communication based on the performance of the embedding search;
    identifying whether the target electronic communication is one of a malicious electronic communication or a non-malicious communication based on an evaluation of the target electronic communication against the at least one distinct historical communication;
    bypassing one or more predetermined cybersecurity threat investigation steps for resolving cybersecurity threats involving one or more target electronic communications based on the evaluation of the electronic sender's address; and
    accelerating a handling of a cybersecurity event associated with the target electronic communication based on whether the target electronic communication is one of the malicious electronic communication or the non-malicious communication, wherein the accelerating the handling of the cybersecurity event includes routing data associated with the target electronic communication to one of a plurality of distinct cybersecurity threat mitigation routes based on the evaluation of the electronic sender's address and identifying the target electronic communication as the malicious electronic communication.

2. The method according to claim 1, wherein performing the embedding search includes:
    computing a cosine distance value between the array of embeddings of the target electronic communication and embeddings of the at least one distinct historical electronic communication of the corpus of embeddings.

3. The method according to claim 2, further comprising:
deriving a similarity score for the at least one distinct historical communication based on the cosine distance value.

4. The method according to claim 1, wherein
identifying the at least one distinct historical electronic communication includes returning the at least one distinct historical electronic communication if a computed similarity score associated with the at least one distinct historical electronic communication satisfies an electronic communication similarity threshold.

5. The method according to claim 1, wherein
identifying whether the target electronic communication is one of the malicious electronic communication or the non-malicious communication includes:
    evaluating a content of the target electronic communication against a content of the at least one distinct historical electronic communication, and
    validating the target electronic communication as the malicious electronic communication based on a phishing similarity.

6. The method according to claim 1, wherein
identifying whether the target electronic communication is one of the malicious electronic communication or the non-malicious communication includes:
    evaluating a content of the target electronic communication against a content of the at least one distinct historical electronic communication, and
    validating the target electronic communication as the non-malicious electronic communication based on a phishing similarity.

7. The method according to claim 1, wherein
the corpus of embeddings of the plurality of distinct historical electronic communications comprises embeddings of a plurality of distinct historical malicious electronic communications.

8. The method according to claim 1, wherein
the corpus of embeddings of the plurality of distinct historical electronic communications comprises embeddings of (a) a plurality of distinct historical malicious electronic communications and (b) a plurality of distinct historical non-malicious electronic communications.

9. The method according to claim 1, wherein
accelerating the detection of the cybersecurity event includes automatically bypassing one or more predetermined cybersecurity threat investigation steps for resolving cybersecurity threats involving the target electronic communication based on identifying the target electronic communication as the malicious electronic communication.

10. A method implemented by one or more computers for accelerating a disposal of a suspected cybersecurity event, the method comprising:
identifying a suspected malicious electronic communication and an electronic sender's address of the suspected malicious electronic communication, wherein the electronic sender's address identifies a communication address of a sender of the suspected electronic communication;
extracting a corpus of content feature data from the suspected malicious electronic communication;
converting the corpus of content feature data of the suspected malicious electronic communication to model input of feature vectors;
evaluating the electronic sender's address against historical sender data associated with one or more historical electronic communications;
computing, by a phishing machine learning model, a cybersecurity threat inference comprising a phishing threat score based on the model input of feature vectors of the suspected malicious electronic communication, wherein the phishing threat score indicates a likelihood that a target electronic communication comprises an adverse electronic communication or a malicious electronic communication;
bypassing one or more predetermined cybersecurity threat investigation steps for resolving cybersecurity threats involving the suspected malicious electronic communication based on the evaluation of the electronic sender's address; and
accelerating a handling of a cybersecurity event associated with the suspected malicious electronic communication based on whether the target electronic communication is one of the malicious electronic communication or the non-malicious communication, wherein the accelerating the handling of the cybersecurity event associated with the suspected malicious electronic communication includes routing data associated with the suspected malicious electronic communication to one of a plurality of distinct cybersecurity threat mitigation routes based on the evaluation of the electronic sender's address and identifying the suspected malicious electronic communication as the malicious electronic communication.

11. The method according to claim 10, wherein
an algorithmic structure of the phishing machine learning model comprises a plurality of distinct learnable parameters for computing the cybersecurity threat inference that map at least to feature vectors computed for each of (1) a text body of the target electronic communication and (2) a web-based domain of a sender of the suspected malicious electronic communication.

12. The method according to claim 10, wherein:
each of a plurality of distinct score ranges of a potential phishing threat score is associated with each of the plurality of distinct cybersecurity threat mitigation routes,
wherein the routing includes:
evaluating the phishing threat score against the plurality of distinct score ranges of the potential phishing threat score; and
selecting a distinct cybersecurity threat mitigation route based on the phishing threat score having a score value that is within a distinct score range of the distinct cybersecurity threat mitigation route of the plurality of distinct cybersecurity threat mitigation routes.

13. A system for accelerating a cybersecurity event detection and remediation, the system comprising:
a text embedding system that computes, using a text embedding model, an array of embeddings based on content feature data extracted from a target electronic communication;
a cybersecurity event identification service implemented by one or more computers that:
identify a corpus of historical submissions of suspected malicious electronic communications;
perform an embedding search of a corpus of embeddings of a plurality of distinct historical electronic communications based on the array of embeddings of the target electronic communication;
identify at least one distinct historical electronic communication based on the performance of the embedding search;
identify whether the target electronic communication is one of a malicious electronic communication or a non-malicious communication based on an evaluation of the target communication against the at least one distinct historical electronic communication;
evaluate the corpus of historical submissions of suspected malicious electronic communications and compute an acceleration or a deceleration priority for the target electronic communication based on the evaluation of the corpus of historical submissions of suspected malicious communications; and
accelerate a handling of a cybersecurity event associated with the target electronic communication based on whether the target electronic communication is one of the malicious electronic communication or the non-malicious communication that includes (1) a prioritization of the target electronic communication within a queue of pending electronic communications based on the computation of the acceleration or the deceleration priority and (2) routing data associated with the target electronic communication to one of the plurality of distinct cybersecurity threat mitigation routes based on identifying the target electronic communication as the malicious electronic communication.

14. The system according to claim 13, further comprising:
a machine learning system that:
computes, using a phishing machine learning model, a cybersecurity threat inference comprising a phishing threat score based on an input of content feature data extracted from the target electronic communication, wherein the phishing threat score indicates a likelihood that a target electronic communication comprises an adverse electronic communication or the malicious electronic communication.

* * * * *